(12) United States Patent
Lu

(10) Patent No.: US 12,192,310 B2
(45) Date of Patent: ***Jan. 7, 2025

(54) WIRELESS COMMUNICATION METHOD, AND COMMUNICATION DEVICE

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 391 days.

This patent is subject to a terminal disclaimer.

(21) Appl. No.: 17/192,244

(22) Filed: Mar. 4, 2021

(65) Prior Publication Data

US 2021/0194996 A1 Jun. 24, 2021

Related U.S. Application Data

(63) Continuation of application No. PCT/CN2018/108473, filed on Sep. 28, 2018.

(51) Int. Cl.
*H04L 69/04* (2022.01)
*H04L 12/46* (2006.01)
*H04L 69/18* (2022.01)
*H04L 69/22* (2022.01)
*H04W 28/06* (2009.01)

(52) U.S. Cl.
CPC .......... *H04L 69/04* (2013.01); *H04L 12/4641* (2013.01); *H04L 69/18* (2013.01); *H04L 69/22* (2013.01); *H04W 28/06* (2013.01)

(58) Field of Classification Search
None
See application file for complete search history.

(56) References Cited

U.S. PATENT DOCUMENTS

| 6,542,931 | B1 | 4/2003 | Le et al. |
| 8,391,148 | B1 | 3/2013 | Wang |
| 10,205,660 | B2 * | 2/2019 | Cox ........................ H04L 69/325 |
| 11,477,306 | B2 * | 10/2022 | Lu ............................ H04L 69/04 |

(Continued)

FOREIGN PATENT DOCUMENTS

| CN | 103609050 A | 2/2014 |
| CN | 103905122 A | 7/2014 |

(Continued)

OTHER PUBLICATIONS

Internet Engineering Task Force (IETF) RFC5795, Mar. 2010, Internet Engineering Task Force, 41 pages. (Year: 2010).*

(Continued)

*Primary Examiner* — Liem H. Nguyen
(74) *Attorney, Agent, or Firm* — Perkins Coie LLP

(57) ABSTRACT

Implementations of the present disclosure relate to a communication method, a communication device, and a network device. The method includes: a first device compressing an Ethernet frame; and the first device sending the compressed Ethernet frame to a second device. The communication method, the communication device and the network device proposed in the implementations of the present disclosure can be used to achieve the transmission of an Ethernet frame.

21 Claims, 6 Drawing Sheets

(56) References Cited

U.S. PATENT DOCUMENTS

| | | | |
|---|---|---|---|
| 2006/0104278 A1* | 5/2006 | Chang | H04L 47/10 370/392 |
| 2012/0106413 A1* | 5/2012 | Huang | H04L 69/22 370/310 |
| 2013/0121345 A1 | 5/2013 | Zhang et al. | |
| 2013/0136003 A1* | 5/2013 | Wang | H04L 41/0803 370/235 |
| 2014/0369365 A1 | 12/2014 | Denio et al. | |
| 2015/0124618 A1* | 5/2015 | Wang | H03M 7/3059 370/235 |
| 2016/0112823 A1* | 4/2016 | Vrind | H04L 12/189 370/329 |
| 2016/0197743 A1 | 7/2016 | Su et al. | |
| 2019/0116521 A1* | 4/2019 | Qiao | H04W 28/06 |
| 2019/0124181 A1* | 4/2019 | Park | H04W 36/0033 |
| 2019/0124572 A1* | 4/2019 | Park | H04W 80/10 |
| 2020/0200860 A1* | 6/2020 | Hong | H04B 17/318 |
| 2021/0195463 A1* | 6/2021 | Zhang | H04W 28/06 |
| 2021/0211933 A1* | 7/2021 | Sun | H04L 69/04 |
| 2021/0219175 A1* | 7/2021 | Xu | H04L 69/04 |
| 2021/0321292 A1* | 10/2021 | Dudda | H04L 69/04 |
| 2022/0159100 A1* | 5/2022 | Xu | H04L 67/5651 |
| 2022/0360469 A1* | 11/2022 | Xu | H04L 12/467 |

FOREIGN PATENT DOCUMENTS

| | | |
|---|---|---|
| CN | 104081747 A | 10/2014 |
| CN | 107347046 A | 11/2017 |
| EP | 2314045 A1 | 4/2011 |
| EP | 2314045 B1 | 7/2013 |
| WO | 2010012998 A1 | 2/2010 |
| WO | 2020125988 A1 | 6/2020 |

OTHER PUBLICATIONS

Examination Report No. 1 for Australian Application No. 2018443582 dated May 12, 2022. 3 pages.
Notification of Reason for Refusal for Korean Application No. 10-2021-7012130 dated Apr. 29, 2022. 11 pages with English translation.
3GPP "3GPP TS 38.323 V16.3.0 (Mar. 2021)—Technical Specification—Release 16" 2021. 40 pages.
3GPP, "3GPP TS 24.501 V17.2.1 (Apr. 2021)—Technical Specification—Release 17" 2021. 757 pages.
EPO, Extended European Search Report for European Application No. 18934541.6, dated Aug. 5, 2021. 12 pages.
Ericsson "Ethernet Header Compression" Tdoc R2-1814811; 3GPP TSF-RAN WG2 #103bis; Chengdu, China; Oct. 8-12, 2018. 5 pages.
International Search Report dated Apr. 28, 2019 cited in PCT/CN2018/108473.
First Office Action for Chinese Application No. 2022100467935 dated Nov. 30, 2022. 14 pages with English translation.
Advisory Action for U.S. Appl. No. 17/316,852 dated Mar. 16, 2022. 5 pages.
Corrected Notice of Allowability for U.S. Appl. No. 17/316,852 dated Jul. 19, 2022. 6 pages.
Corrected Notice of Allowability for U.S. Appl. No. 17/316,852 dated Sep. 19, 2022. 4 pages.
Final Office Action for U.S. Appl. No. 17/316,852 dated Dec. 13, 2021. 11 pages.
Non-Final Office Action for U.S. Appl. No. 17/316,852 dated Aug. 5, 2021. 14 pages.
Notice of Allowance for U.S. Appl. No. 17/316,852 dated Apr. 29, 2022. 16 pages.
Second Office Action for Chinese Application No. 202210046793.5 dated Feb. 28, 2023. 17 pages with English translation.
Decision of Rejection of the Chinese application No. 202210046793.5, dated May 24, 2023. 11 pages with English translation.
Third Office Action of the Chinese application No. 202210046793.5, dated Oct. 11, 2023. 7 pages with English Translation.
Hearing Notice of the IN application No. 202127028672, issued on Apr. 5, 2024. 2 pages.

* cited by examiner

300

310 — A second device acquires an Ethernet frame from a first device

320 — The second device decompresses the Ethernet frame

400

410 — A network device sends configuration information to a terminal device, the configuration information including information for compressing or decompressing an Ethernet frame

WIRELESS COMMUNICATION METHOD, AND COMMUNICATION DEVICE

CROSS-REFERENCE TO RELATED APPLICATION

The present application is a continuation application of International PCT Application No. PCT/CN2018/108473, filed on Sep. 28, 2018, the entire content of which is hereby incorporated by reference.

TECHNICAL FIELD

The present disclosure relates to the field of communications, and more particularly to, a communication method, a terminal device and a network device.

BACKGROUND

In a Long Term Evolution (LTE) system, a type of a Protocol Data Unit (PDU) session is an Internet Protocol (IP) type.

In a New Radio (NR) system, not only an IP packet type is supported, but also an Ethernet frame type is introduced.

How to implement transmission of Ethernet frames is a problem to be solved urgently.

SUMMARY

Implementations of the present disclosure provide a communication method, a communication device and a network device, so as to implement transmission of Ethernet frames.

In a first aspect, there is provided a communication method including: a first device compressing an Ethernet frame; and the first device sending the compressed Ethernet frame to a second device.

In a second aspect, there is provided a communication method including: a second device acquiring an Ethernet frame from a first device; and the second device decompressing the Ethernet frame.

In a third aspect, there is provided a communication method including: a network device sending configuration information to a terminal device, the configuration information including information for compressing or decompressing an Ethernet frame.

In a fourth aspect, there is provided a communication device used for executing the method according to the first aspect described above and various implementations thereof.

Specifically, the terminal device includes function modules used for executing the method according to the first aspect described above and various implementations thereof.

In a fifth aspect, there is provided a communication device used for executing the method according to the second aspect described above and various implementations thereof.

Specifically, the network device includes function modules used for executing the method according to the second aspect described above and various implementations thereof.

In a sixth aspect, there is provided a communication device used for executing the method according to the third aspect described above and various implementations thereof.

Specifically, the network device includes function modules used for executing the method according to the third aspect described above and various implementations thereof.

In a seventh aspect, there is provided a communication device including a processor and a memory. The memory is used for storing a computer program, and the processor is used for calling and running the computer program stored in the memory to execute the method according to the first aspect described above and various implementations thereof.

In an eighth aspect, there is provided a communication device including a processor and a memory. The memory is used for storing a computer program, and the processor is used for calling and running the computer program stored in the memory to execute the method according to the second aspect described above and various implementations thereof.

In a ninth aspect, there is provided a network device including a processor and a memory. The memory is used for storing a computer program, and the processor is used for calling and running the computer program stored in the memory to execute the method according to the third aspect described above and various implementations thereof.

In a tenth aspect, there is provided a chip for implementing the method according to any one of the first to third aspects described above and various implementations thereof.

Specifically, the chip includes a processor for calling and running a computer program from a memory, so that a device installed with the chip executes the method according to any one of the first to third aspects described above and various implementations thereof.

In an eleventh aspect, there is provided a computer readable storage medium for storing a computer program that enables a computer to execute the method according to any one of the first to third aspects described above and various implementations thereof.

In a twelfth aspect, there is provided a computer program product including computer program instructions that enable a computer to execute the method according to any one of the first to third aspects described above and various implementations thereof.

In a thirteenth aspect, there is provided a computer program, which, when running on a computer, enables the computer to execute the method according to any one of the first to third aspects described above and various implementations thereof.

Therefore, in the implementations of the present disclosure, the first device compresses the Ethernet frame; and the first device sends the compressed Ethernet frame to the second device, so that transmission of the Ethernet frame can be implemented, and the Ethernet frame is compressed during the transmission, thereby saving transmission resources.

DETAILED DESCRIPTION

Technical solutions in implementations of the present disclosure will be described below in combination with the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, a LTE Time Division Duplex (TDD) system, a Universal Mobile Telecommunications System (UMTS), a Worldwide Interoperability for Microwave Access (WiMAX) communication system or a 5G system.

Figure 1:
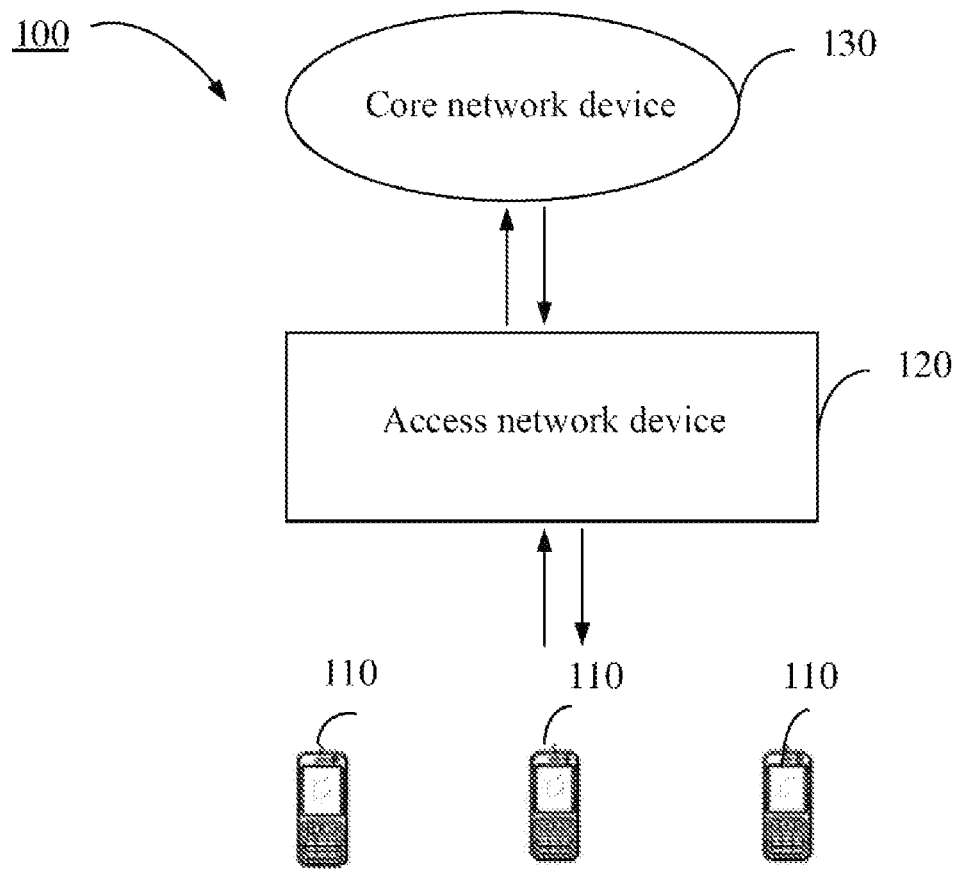
FIG. 1 is a schematic diagram of an architecture of a communication system in accordance with an implementation of the present disclosure.

Illustratively, a communication system 100 applied in an implementation of the present disclosure is shown in FIG. 1. The communication system 100 may include a terminal device 110. The terminal device 110 may be located within a coverage area of an access network device 120. The "terminal device" as used herein includes, but is not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a handheld digital video broadcasting-handheld (DVB-H) network, a satellite network, and an amplitude modulation-frequency modulation (AM-FM) broadcast transmitter; and/or an apparatus of another terminal configured to receive/transmit communication signals; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular phone; a personal communication system (PCS) terminal capable of combining a cellular radio phone with data processing, facsimile, and data communication abilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic device including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a 5G network, or a terminal device in a future evolved Public Land Mobile Network (PLMN).

The communication system 100 may include an access network device 120. The access network device 120 may be a device that communicates with the terminal device 110 (or referred to as a communication terminal, or a terminal). The access network device 120 may provide communication coverage for a specific geographical area, and may communicate with a terminal device located within the coverage area. Optionally, the access network device 120 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the access network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN).

The wireless communication system 100 further includes a core network device 130 that communicates with the access network device. Optionally, the core network device 130 may be a 5G core network device, for example, an Access and Mobility Management Function (AMF) device, which is responsible for access and mobility management, and has functions such as authentication, handover and location update for users. As another example, the core network device 130 may be a Session Management Function (SMF) device, which is responsible for session management, including establishment, modification and release of packet data unit (PDU) sessions. As another example, the core network device 130 may be a user plane function (UPF) device, which is responsible for forwarding of user data. The core network device may be a core network device of an LTE system or another system.

Optionally, the 5G system or 5G network may be referred to as a New Radio (NR) system or an NR network.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is an "or" relationship between the associated objects before and after "/".

Optionally, the implementations of the present disclosure can be used in a public land network or a local network.

The public land network may be a PLMN-based public land network.

The local network can also be called a local area network or a private network. The local network is usually laid out in an office scenario, a home scenario and a factory, so as to implement more effective and safe management. The local network is usually laid out by local users or managers. Generally, authorized accessible users have the right to gain access to the local network.

The local network may or may not be managed or administered by the public land network.

Optionally, the local network can use licensed frequency bands for communication, or can share licensed frequency bands with the public land network.

Optionally, the local network may be a network of 3GPP. A core network of the local network may be a core network of NR or LTE, and the local network may gain access to the core network through an NR access network, an LTE access network or Wireless Fidelity (WiFi).

Optionally, in an implementation of the present disclosure, the core network can be shared by the public land network and the local network, while the access network is independent; or the access network can be shared, while the core network is independent; or both the access network and the core network can be shared; or neither the access network nor the core network is shared.

Optionally, in an implementation of the present disclosure, the core network can be shared by multiple or multiple types of local networks, while the access network is independent; or the access network can be shared and the core network is independent; or both the access network and the core network can be shared; or neither the access network nor the core network is shared.

Frame formats of an Ethernet frame available to an implementation of the present disclosure will be described below.

In a frame format in FIG. 1, a header may include a destination address, a source address and a type, and a data part may include data. In addition, two portions that are not transmitted in the 5G network, a preamble and a frame check sequence (FCS), are also included. The Ethernet frame shown in FIG. 1 may be of Ethernet II frame type.

Figure 2:
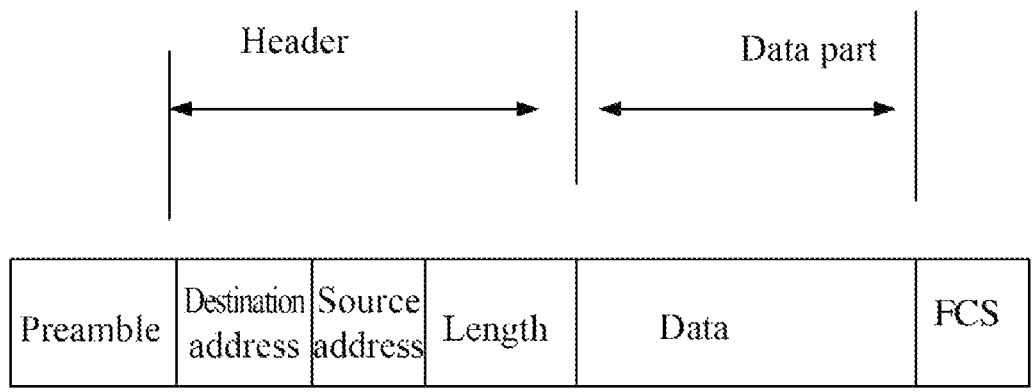
FIG. 2 is a schematic diagram of a frame format in accordance with an implementation of the present disclosure.

In a frame format in FIG. 2, a header may include a destination address, a source address and a length, and a data part may include data. In addition, two portions that are not transmitted in the 5G network, a preamble and a frame check sequence (FCS), are also included. The Ethernet frame shown in FIG. 2 may be of Ethernet 802.3 SNAP frame type.

Figure 3:
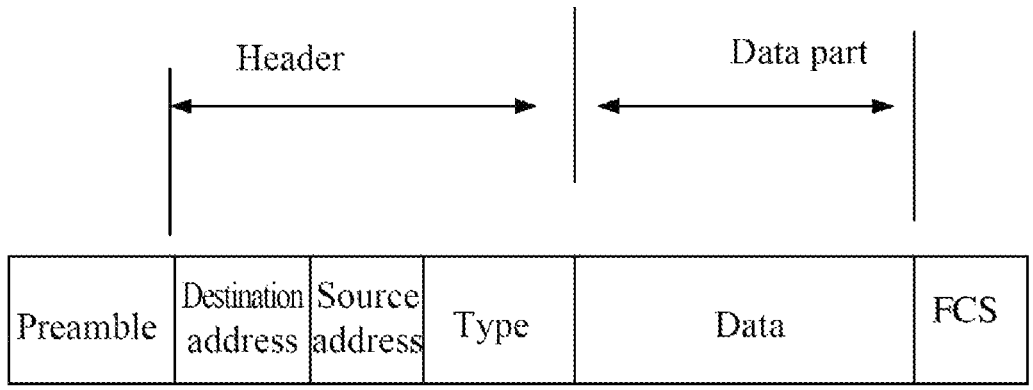
FIG. 3 is a schematic diagram of another frame format in accordance with an implementation of the present disclosure.
Figure 4:
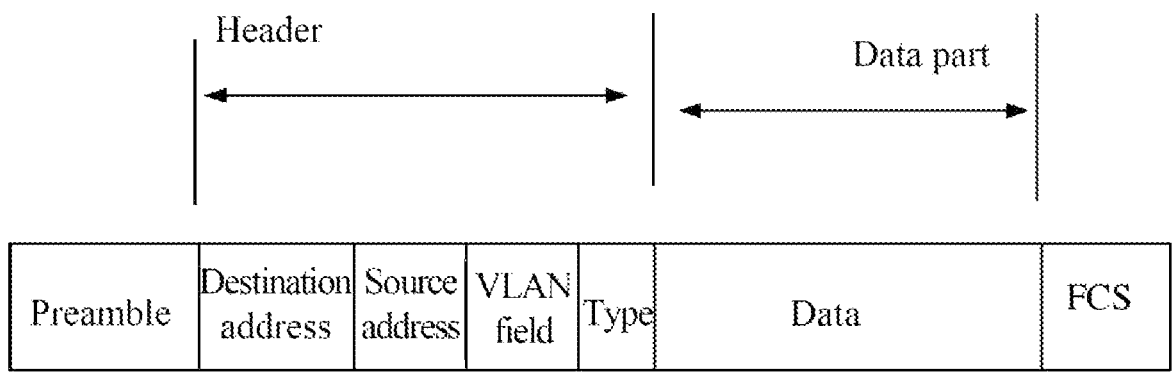
FIG. 4 is a schematic diagram of another frame format in accordance with an implementation of the present disclosure.

In the frame format shown in FIG. 2 or FIG. 3, a VLAN field, which indicates information about a VLAN, may also be added, for example, as shown in FIG. 4.

It should be understood that the frame formats shown in FIGS. 2 to 4 are described by way of example only, and should not be construed as limitations to the implementations of the present disclosure.

It should also be understood that various implementation modes of the implementations of the present disclosure can also be applied to other types of frames in addition to an Ethernet frame, which will not be repeated herein in the implementations of the present disclosure for the sake of brevity.

Figure 5:
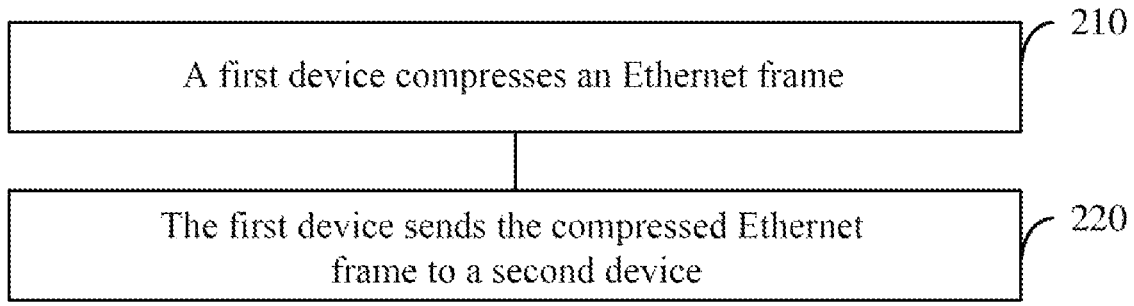
FIG. 5 is a schematic flow chart of a communication method in accordance with an implementation of the present disclosure.

FIG. 5 is a schematic flow chart of a wireless communication method 200 in accordance with an implementation of the present disclosure. The method 200 includes at least part of the following contents. The method 200 can be used for downlink transmission or uplink transmission. When the method is used for downlink transmission, a first device may be a network side device (such as an access network device or a core network device), and a second device may be a terminal device. When the method is used for uplink transmission, the first device may be a terminal device, and the second device may be a network side device (for example, an access network device or a core network device).

In 210, a first device compresses an Ethernet frame. And in 220, the first device sends the compressed Ethernet frame to a second device.

The compression of the Ethernet frame by the first device may include compression of a header and/or a data part of the Ethernet frame.

Specifically, the first device may compress the header and/or data part based on a sub-protocol (profile) identifier (ID).

The sub-protocol ID mentioned in an implementation of the present disclosure can indicate a compression object and a compression strategy. The compression object may correspond to a protocol adopted by the data part and/or correspond to an Ethernet frame type adopted by the header and/or whether the header includes a VLAN field. The compression strategy may indicate how the compression is implemented.

The protocol adopted by the data part may include an Encapsulating Security Payloads (ESP) protocol, an IP, a User Datagram Protocol (UDP), a Real-time Transport Protocol (RTP), etc., and the compression strategy may include RFC 5225, RFC 6846, RFC 3095, RFC 4815, etc.

Types of Ethernet frames may include frame types of Institute of Electrical and Electronics Engineers (IEEE) 802.3 service accessing point (SAP) and Ethernet II. Of course, there may also be other frame types, which are not specifically limited in the implementations of the present disclosure. Or the Ethernet frames can be classified according to whether a VLAN field is included or not.

There may be one or more protocols corresponding to a compression object of a sub-protocol ID, there may be one or more types of Ethernet frames adopted by corresponding headers, and compression of a sub-protocol ID can correspond to inclusion of a VLAN field, or exclusion of a VLAN field, or both.

Optionally, in the present disclosure, the header and the data part are compressed based on the same first sub-protocol ID for the header and the data part.

Optionally, the first sub-protocol ID is used for indicating a compression object and a compression strategy; wherein the compression object indicated by the first sub-protocol ID includes a data part and a header, and the compression object indicated by the first sub-protocol ID corresponds to a protocol adopted by the data part, and corresponds to an Ethernet frame type adopted by the header and/or whether the header includes a virtual local area network (VLAN) field.

Specifically, the compression object in the first sub-protocol ID may indicate that both the data part and the header are compressed, wherein there may be one or more protocols of the data part of the first sub-protocol ID, there may be one or more Ethernet frame types of the header corresponding to the first sub-protocol ID, and the header corresponding to the first sub-protocol ID may include the VLAN field or exclude the VLAN field.

For example, the first sub-protocol ID may be sub-protocol IDs as in Table 1: 0x0007, 0x0008, 0x0009, 0x000A, 0x000B, 0x010A, 0x010B, 0x010C, 0x010D, 0x000B, 0x000C, 0x000D, 0x000E, 0x000F, 0x0105, 0x0106, 0x0107 and 0x0108. In Table 1, protocols of the data part corresponding to the sub-protocol ID are RTP, UDP, ESP, IP, etc. If the sub-protocol ID corresponds to multiple protocols, it is indicated that the data part of the multiple protocols (the header also needs to meet requirements of the sub-protocol ID) is compressed according to the corresponding compression strategies. VLAN/Ethernet represents Ethernet frames carrying the VLAN field, and Ethernet represents Ethernet frames without the VLAN field.

TABLE 1

| Sub-protocol ID | Compression object (Usage) | Compression strategy (Reference) |
| --- | --- | --- |
| 0x0000 | Uncompressed | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |
| 0x0007 | RTP/UDP/IP/VLAN/Ethernet | RFC 3095, RFC 4815 |
| 0x0008 | UDP/IP/VLAN/Ethernet | RFC 3095, RFC 4815 |
| 0x0009 | ESP/IP/VLAN/Ethernet | RFC 3095, RFC 4815 |
| 0x000A | IP/VLAN/Ethernet | RFC 3843, RFC 4815 |
| 0x000B | TCP/IP/VLAN/Ethernet | RFC 6846 |
| 0x010A | RTP/UDP/IP/VLAN/Ethernet | RFC 5225 |
| 0x010B | UDP/IP/VLAN/Ethernet | RFC 5225 |
| 0x010C | ESP/IP/VLAN/Ethernet | RFC 5225 |
| 0x010D | IP/VLAN/Ethernet | RFC 5225 |
| 0x000B | RTP/UDP/IP/Ethernet | RFC 3095, RFC 4815 |
| 0x000C | UDP/IP/Ethernet | RFC 3095, RFC 4815 |
| 0x000D | ESP/IP/Ethernet | RFC 3095, RFC 4815 |
| 0x000E | IP/Ethernet | RFC 3843, RFC 4815 |
| 0x000F | TCP/IP/Ethernet | RFC 6846 |
| 0x0105 | RTP/UDP/IP/Ethernet | RFC 5225 |
| 0x0106 | UDP/IP/Ethernet | RFC 5225 |
| 0x0107 | ESP/IP/Ethernet | RFC 5225 |
| 0x0108 | IP/Ethernet | RFC 5225 |

As described above, the header and the data part can be compressed based on the same sub-protocol ID. In an implementation, the header and the data part can also be compressed respectively based on different sub-protocol IDs.

Specifically, the header is compressed based on a second sub-protocol ID for the header; and the data part is compressed based on a third sub-protocol ID different from the second sub-protocol ID for the data part.

The second sub-protocol ID is used for indicating a compression object and a compression strategy, wherein the compression object indicated by the second sub-protocol ID includes the header and corresponds to the Ethernet frame type adopted by the header and/or whether the header includes a VLAN field; and/or the third sub-protocol ID is used for indicating a compression object and a compression strategy, wherein the compression object indicated by the third sub-protocol ID includes the data part, and corresponds to the protocol adopted by the data part.

For example, as shown in Table 1, the sub-protocol IDs 0x0001, 0x0002, 0x0003, 0x0004, 0x0006, 0x0101, 0x0102, 0x0103 and 0x0104 can be understood as the third sub-protocol ID in an implementation of the present disclosure, wherein the compression object corresponds to at least one protocol, that is, an Ethernet frame of each of the at least one protocol is compressed according to its corresponding compression strategy.

For example, as shown in Table 2 below, 0x0105, 0x0106, 0x0007, 0x0008, 0x0009 and 0x000A can be understood as the second sub-protocol ID in an implementation of the present disclosure, wherein VLAN/Ethernet represents Ethernet frames carrying the VLAN field, and Ethernet represents an Ethernet frames without the VLAN field.

TABLE 2

| Sub-protocol ID | Compression object (Usage) | Compression strategy (Reference) |
| --- | --- | --- |
| 0x0105 | VLAN/Ethernet | RFC 5225 |
| 0x0106 | Ethernet | RFC 5225 |
| 0x0007 | VLAN/Ethernet | RFC 6846 |
| 0x0008 | Ethernet | RFC 6846 |
| 0x0009 | VLAN/Ethernet | RFC 3095, RFC 4815 |
| 0x000A | Ethernet | RFC 3095, RFC 4815 |

Optionally, in an implementation of the present disclosure, for the Ethernet frames with different formats, the sub-protocol IDs on which the compression of the header is based are different; and/or for the Ethernet frames with different formats, the sub-protocol IDs on which the compression of the data part is based are different.

For example, for format 1, the sub-protocol ID adopted by the header may be ID1, and for format 2, the sub-protocol ID adopted by the header may be ID2, which may be different from ID1. For format 1, the sub-protocol ID adopted by the data part may be ID3, and for format 2, the sub-protocol ID adopted by the data part may be ID4, which may be different from ID3. ID1 may be the same as ID3, or may be different from ID3; or ID2 may be the same as or different from ID4.

Optionally, in an implementation of the present disclosure, the contents containing VLAN/Ethernet or Ethernet in the header compression object in Table 1 and/or Table 2 above can be extended. For different Ethernet frame formats, special sub-protocol IDs and their corresponding header compression strategies are defined respectively.

For example, Table 2 is expanded. The sub-protocol ID may include a compression object and a compression strategy, the compression object may indicate a frame format, and if the compression object indicates the frame format, it may be indicated that a header of a frame with the frame format is compressed.

For example, in Table 3, a compression object of each sub-protocol ID indicates frame formats and compression strategies of different Ethernet frames. Both the header and the data part are compressed, and the strategy adopted for compression is a compression strategy corresponding to the sub-protocol ID.

| Sub-protocol ID | Compression object (Usage) | Compression strategy (Reference) |
| --- | --- | --- |
| 0x010B | VLAN/Ethernet II | RFC 5225 |
| 0x010C | Ethernet II | RFC 5225 |
| 0x010D | VLAN/IEEE 802.3 SAP | RFC 5225 |
| 0x010E | IEEE 802.3 SAP | RFC 5225 |
| 0x010F | VLAN/IEEE 802.3 SNAP | RFC 5225 |
| 0x0110 | IEEE 802.3 SNAP | RFC 5225 |

Optionally, in an implementation of the present disclosure, the first device is a terminal device. The terminal device compresses the header at a first protocol layer, and/or the terminal device compresses the data part at a second protocol layer.

The first protocol layer may be the same as the second protocol layer, or the first protocol layer is different from the second protocol layer.

The first protocol layer is optionally a packet data convergence protocol (PDCP) layer, a protocol data unit (PDU) layer or a newly added sub-layer in a fifth generation communication system (5G) network. Optionally, the second protocol layer is a PDCP layer, a PDU layer or a newly added sub-layer in the 5G network.

Optionally, in an implementation of the present disclosure, when the first device is a terminal device, the first device may receive first signaling, which is used for indicating a sub-protocol ID used for compressing the data part.

The first signaling comes from an access network device, and is radio resource control (RRC) signaling, or the first signaling comes from a core network control entity.

Optionally, in an implementation of the present disclosure, when the first device is a terminal device, the first device may receive second signaling, which is used for indicating a sub-protocol ID used for compressing the header.

The second signaling may come from a core network control entity or an access network device.

Optionally, in an implementation of the present disclosure, the terminal device reports a compression capability for the Ethernet frame, which includes compression capabilities for the header and/or the data part of the Ethernet frame.

The compression capability indicates the compression capability for the header and the compression capability for the data part, respectively.

The compression capability for the header optionally includes: whether compression of the header is supported; or whether compression of the header including the Virtual Local Area Network (VLAN) field is supported and/or whether compression of the header excluding the VLAN field is supported.

A case where the first device is a terminal device is described above, and a case where the first device is a core network device or an access network device will be described below.

Optionally, in an implementation of the present disclosure, the first device is a core network device. The core network device compresses the header without compressing the data part; or the core network device compresses both the header and the data part.

The core network device is a user plane function (UPF) entity device.

Optionally, in an implementation of the present disclosure, the first device is an access network device. The access network device can compress the data part without compressing the header; or the access network device compresses both the header and the data part. If the access network device does not compress the data part, the core network device can compress the header.

If the first device is an access network device, it can also send signaling to the terminal device, indicating a sub-protocol ID used for compressing the header and/or data part. The sub-protocol ID can be used for terminal device to compress uplink Ethernet frames or decompress downlink Ethernet frames.

For example, if the access network layer compresses the data part, the signaling indicates the sub-protocol ID used for compressing the data part. The sub-protocol ID used for compressing the header can be configured by the core network control entity, and of course, it can also be configured by the access network device.

For example, if the access network layer compresses both the header and the data part, the signaling indicates the sub-protocol ID used for compressing both the header and the data part.

It should be understood that the access network device can also compress the header without compressing the data part, which is not specifically limited in the implementations of the present disclosure.

Optionally, in the implementation of the present disclosure, after receiving the Ethernet frame, the second device can decompress the Ethernet frame and feed back a decompression result (e.g., feeding back a PDCP control PDU for interleaved ROHC feedback). Optionally, the decompression result can feed back whether decompression is successful or not. The decompression result may optionally be a packet decompression state corresponding to a sequence number (SN).

Optionally, if the second device decompresses the data part, a decompression result for the data part can be fed back. If the second device decompresses the header, a decompression result for the header can be fed back. If the second device decompresses both the header and the data part, a decompression result for the entire Ethernet frame can be fed back. For example, if only the header is not decompressed successfully, that the Ethernet frame is not decompressed successfully can be fed back, or the second device can feed back for each part separately, for example, if the header is not decompressed successfully, that the header is not decompressed successfully can be fed back.

Optionally, the feedback result may be carried in a feedback frame, which is a feedback for at least part of the compressed part of the Ethernet frame.

For example, the at least part is a variable part of the Ethernet frame (e.g., a VLAN field, a length field and a type field) and/or a static part of the Ethernet frame (e.g., a source address and a destination part).

For example, the at least part may include a header and/or a data part.

In the case that the feedback frame is received, if the feedback frame indicates that the at least part is not decompressed successfully, the first device may retransmit the at least part, or retransmit the header to which the at least part belongs, or retransmit the data part to which the at least part belongs, or retransmit the Ethernet frame.

Or, in the case that the feedback frame is received, if the feedback frame indicates that the at least part is not decompressed successfully, the first device determines whether a compression state machine transition will be performed, and that a more reliable compression state machine will be used for header compression if transition is required. A corresponding decompression end performs decompression according to the corresponding decompression state machine.

Optionally, in an implementation of the present disclosure, the first device determines whether the feedback frame aims at the data part or the header of the Ethernet frame.

Specifically, in an implementation of the present disclosure, when the second device generates the feedback frame, the feedback frame can be generated to determine whether the feedback frame aims at the header or the data part. After receiving the feedback frame, the first device can determine whether the feedback frame aims at the data part or the header, and can perform retransmission accordingly.

In an implementation mode, the first device determines whether the feedback frame aims at the data part or the header of the Ethernet frame by using a frame format of the feedback frame and/or a sub-protocol ID included in the feedback frame.

For example, one frame format may indicate that the feedback frame aims at the header, and another frame format may indicate that the feedback frame aims at the data part.

For example, the sub-protocol ID used for decompression can be carried in the feedback frame, and the first device can determine whether the feedback frame aims at the data part or the header based on the sub-protocol ID.

Optionally, in an implementation of the present disclosure, the first device determines whether the feedback frame aims at the data part or the header of the Ethernet frame by using a reserved bit of the header of the feedback frame or by using a feedback part indication bit in a PDU type field of the feedback frame. The reserved bit can be called a feedback part indication bit.

Figures 6, 7, 8:
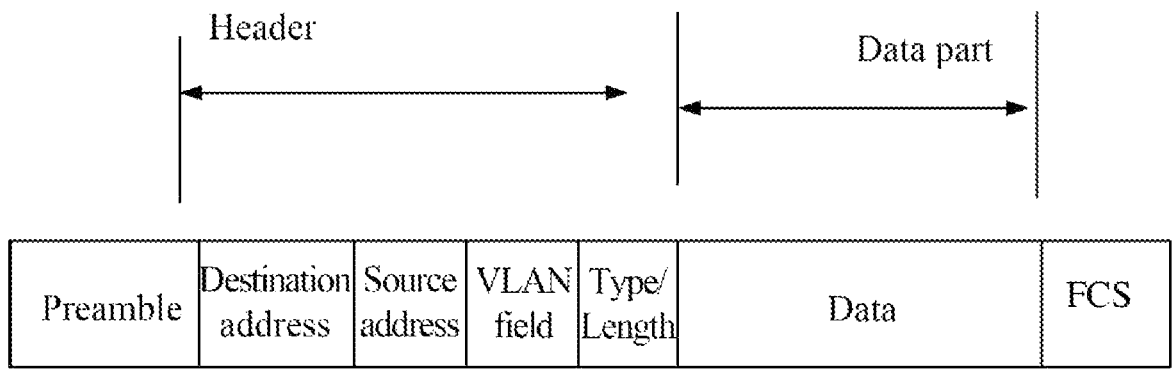
FIG. 6 is a schematic diagram of a feedback frame in accordance with an implementation of the present disclosure.
FIG. 7 is a schematic flow chart of a communication method in accordance with an implementation of the present disclosure.
FIG. 8 is a schematic flow chart of a communication method in accordance with an implementation of the present disclosure.

For example, in the feedback frame as shown in FIG. 6, an original reserved bit (R) of the header of the feedback frame can be used for indicating whether the feedback frame aims at a header or a data part. For example, if a certain value is carried, then it may indicate that the feedback frame aims at a header, and if a certain value is not carried, then it may indicate that the feedback frame aims at a data part; or if a certain value is carried, then it may indicate that the feedback frame aims at a data part, and if a certain value is not carried, then it may indicate that the feedback frame aims at the header. Or, if one value is carried, then it may indicate that the feedback frame aims at a header, and if another value is carried, then it may indicate that the feedback frame aims at a data part.

Or there may also be a portion of bits in the PDU type field as shown in FIG. 6, as the feedback part indication bits. For example, if a certain value is carried in the portion of bits, then it may indicate that the feedback frame aims at a header, and if a certain value is not carried in the portion of bits, then it may indicate that the feedback frame aims at a data part; or if a certain value is carried in the portion of bits, then it may indicate that the feedback frame aims at a data part, and if a certain value is not carried in the portion of bits, then it may indicate that the feedback frame aims at the header. Or, if one value is carried in the portion of bits, then it may indicate that the feedback frame aims at a header, and if another value is carried in the portion of bits, then it may indicate that the feedback frame aims at a data part.

The feedback frame can be called an interspersed robust header compression (ROHC) feedback frame.

Optionally, in an implementation of the present disclosure, an SN (e.g., 16 bits) may be generated during header compression of the Ethernet frame. An initial value of the SN may be 0, and the value of the SN may be increased by 1 every time a packet is obtained, or the value of the SN may be taken as the same value as that of an SN in a data field.

Optionally, in an implementation of the present disclosure, an SN of the header may be carried in a feedback frame aiming at the header, and an SN of the data part may be carried in a feedback frame aiming at the data part.

FIG. 7 is a schematic flow chart of a wireless communication method 300 in accordance with an implementation of the present disclosure. The method 300 may include at least part of the following contents.

In 310, a second device acquires an Ethernet frame from a first device.

In 320, the second device decompresses the Ethernet frame.

Optionally, in an implementation of the present disclosure, the second device decompresses a header and/or a data part included in the Ethernet frame.

Optionally, in an implementation of the present disclosure, the second device decompresses the header and the data part based on the same first sub-protocol ID for the header and the data part.

Optionally, the first sub-protocol ID is used for indicating a compression object and a compression strategy; wherein the compression object indicated by the first sub-protocol ID includes the data part and the header, and corresponds to a protocol adopted by the data part, and corresponds to an Ethernet frame type adopted by the header and/or whether the header includes a virtual local area network (VLAN) field.

Optionally, in an implementation of the present disclosure, the header is decompressed based on a second sub-protocol ID for the header; and the data part is decompressed based on a third sub-protocol ID different from the second sub-protocol ID for the data part.

The second sub-protocol ID is used for indicating a compression object and a compression strategy, wherein the compression object indicated by the second sub-protocol ID includes the header and corresponds to an Ethernet frame type adopted by the header and/or whether the header includes a VLAN field; and/or the third sub-protocol ID is used for indicating a compression object and a compression strategy, wherein the compression object indicated by the third sub-protocol ID includes the data part, and corresponds to the protocol adopted by the data part.

Optionally, in an implementation of the present disclosure, for the Ethernet frames with different formats, the sub-protocol IDs on which the decompression of the header is based are different; and/or for the Ethernet frames with different formats, the sub-protocol IDs on which the decompression of the data part is based are different.

Optionally, in an implementation of the present disclosure, the first device is a terminal device. The terminal device decompresses the header at a first protocol layer, and/or the terminal device decompresses the data part at a second protocol layer. A compression end of the header and/or data part can be a core network device or an access network device.

For example, the header may be compressed by the core network device, and the data part may be compressed by the access network device.

For example, both the header and the data part can be compressed by the core network device or by the access network device.

The first protocol layer is the same as the second protocol layer, or the first protocol layer is different from the second protocol layer.

The first protocol layer is optionally a packet data convergence protocol (PDCP) layer, a protocol data unit (PDU) layer or a newly added sub-layer in a fifth generation communication system (5G) network. Optionally, the second protocol layer is a PDCP layer, a PDU layer or a newly added sub-layer in the 5G network.

Optionally, in an implementation of the present disclosure, the second device is a terminal device. The terminal device receives first signaling, which is used for indicating a sub-protocol ID used for decompressing the data part.

The first signaling comes from an access network device or a core network control entity.

Optionally, in an implementation of the present disclosure, the first device is a terminal device. The terminal device receives second signaling, which is used for indicating a sub-protocol ID used for decompressing the header.

The second signaling may optionally come from a core network control entity or an access network device.

Optionally, in an implementation of the present disclosure, the first device is a core network device. The core network device decompresses the header without decompressing the data part; or the core network device decompresses both the header and the data part.

The core network device is optionally a user plane function (UPF) entity device.

Optionally, in an implementation of the present disclosure, the first device is an access network device.

Optionally, in an implementation of the present disclosure, the access network device decompresses the data part without decompressing the header; or the access network device decompresses both the header and the data part.

Optionally, in an implementation of the present disclosure, the second device sends a feedback frame of the Ethernet frame, the feedback frame being a feedback for at least part of the compressed part of the Ethernet frame.

The at least part may be a variable part of the Ethernet frame and/or a static part of the Ethernet frame.

Optionally, in an implementation of the present disclosure, the second device generates the feedback frame for determining whether to aim at the data part or the header of the Ethernet frame.

In an implementation mode, it is determined, for the feedback frame, whether the feedback frame aims at the data part or the header of the Ethernet frame through a frame format of the feedback frame and/or a sub-protocol ID included in the feedback frame.

It can be optionally determined, for the feedback frame, whether the feedback frame aims at the data part or the header of the Ethernet frame through a reserved bit of the header of the feedback frame or through a feedback part indication bit in a PDU type field of the feedback frame.

Optionally, an ID used for a device to compress an Ethernet frame can be applicable to decompression of an Ethernet frame by the device.

Optionally, if a device compresses a header of one frame, it can decompress a header of another frame. If a device compresses a data part of one frame, it can decompress a data part of another frame. If a device compresses both a header and a data part of one frame, it can decompress both a header and a data part of another frame.

It should be understood that the method 300 is applicable to a decompression end and the method 200 is applicable to a compression end. Description of the decompression end can be made with reference to the description in the method 200, and will not be repeated herein for brevity.

FIG. 8 is a schematic flow chart of a wireless communication method 400 in accordance with an implementation of the present disclosure. The method 400 includes at least part of the following contents.

In 410, configuration information is sent to a terminal device, the configuration information including information for compressing or decompressing an Ethernet frame.

Optionally, the configuration information includes a sub-protocol ID used for compressing or decompressing the Ethernet frame and/or other compression configuration parameter used for compressing or decompressing the Ethernet frame.

Other compression configuration parameter used for the compression or decompression may be used for at least one of:

indicating a maximum context ID used in the compression;

determining a range of a content ID used in the compression; and determining whether header compression is performed on only uplink.

Optionally, in an implementation of the present disclosure, the configuration information includes a first sub-protocol ID, which is used for compressing a data part and a header of the Ethernet frame.

The first sub-protocol ID is optionally used for indicating a compression object and a compression strategy; wherein the compression object indicated by the first sub-protocol ID includes the data part and the header, and corresponds to a protocol adopted by the data part, and corresponds to an Ethernet frame type adopted by the header and/or whether the header includes a virtual local area network (VLAN) field.

Optionally, in an implementation of the present disclosure, the configuration information includes a second sub-protocol ID that is used for compressing the header of the Ethernet frame, and/or a third sub-protocol ID that is used for compressing the data part of the Ethernet frame and is different from the second sub-protocol ID.

The second sub-protocol ID is used for indicating a compression object and a compression strategy, wherein the compression object indicated by the second sub-protocol ID includes the header and corresponds to the Ethernet frame type adopted by the header and/or whether the header includes a VLAN field; and/or the third sub-protocol ID is used for indicating a compression object and a compression strategy, wherein the compression object indicated by the third sub-protocol ID includes the data part.

Optionally, in an implementation of the present disclosure, a network device may receive a compression capability for the Ethernet frame sent by the terminal device, the compression capability including a compression capability for the header of the Ethernet frame and/or a compression capability for the data part of the Ethernet frame. The network device sends the configuration information to the terminal device based on the compression capability.

Optionally, in an implementation of the present disclosure, the compression capability indicates the compression capability for the header and the compression capability for the data part, respectively.

Optionally, in an implementation of the present disclosure, the compression capability for the header includes: whether compression of the header is supported; or whether compression of the header including the VLAN field is supported and/or whether compression of the header excluding the VLAN field is supported.

The communication methods in accordance with the implementations of the present disclosure have been described in detail above, and communication devices in accordance with embodiments of the present disclosure will be described below in conjunction with FIGS. 9 to 11. The technical features described in the method embodiments are applicable to the following device embodiments.

Figure 9:
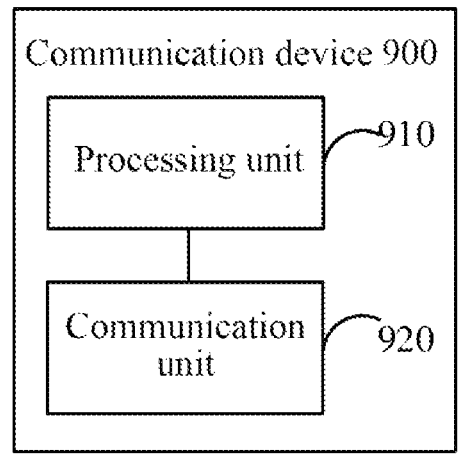
FIG. 9 is a schematic block diagram of a communication device in accordance with an implementation of the present disclosure.

FIG. 9 shows a schematic block diagram of a communication device 900 in accordance with an embodiment of the present disclosure. As shown in FIG. 9, the communication device 900 includes: a processing unit 910 and a communication unit 920.

The processing unit 910 is configured to compress an Ethernet frame.

The communication unit 920 is configured to send the compressed Ethernet frame to a second device.

Optionally, in an embodiment of the present disclosure, the processing unit 910 is specifically configured to compress a header and/or a data part included in the Ethernet frame.

Optionally, in an embodiment of the present disclosure, the processing unit 910 is specifically configured to compress the header and the data part based on the same first sub-protocol ID for the header and the data part.

Optionally, in an embodiment of the present disclosure, the first sub-protocol ID is used for indicating a compression object and a compression strategy; wherein the compression object indicated by the first sub-protocol ID includes the data part and the header, and corresponds to a protocol adopted by the data part, and corresponds to an Ethernet frame type adopted by the header and/or whether the header includes a virtual local area network (VLAN) field.

Optionally, in an embodiment of the present disclosure, the processing unit 910 is specifically configured to: compress the header based on the second sub-protocol ID for the header; and compress the data part based on a third sub-protocol ID different from the second sub-protocol ID for the data part.

The second sub-protocol ID is used for indicating a compression object and a compression strategy, wherein the compression object indicated by the second sub-protocol ID includes the header and corresponds to an Ethernet frame type adopted by the header and/or whether the header includes a VLAN field; and/or the third sub-protocol ID is used for indicating a compression object and a compression strategy, wherein the compression object indicated by the third sub-protocol ID includes the data part, and corresponds to the protocol adopted by the data part.

Optionally, in an embodiment of the present disclosure, for the Ethernet frames with different formats, the sub-protocol IDs on which the compression of the header is based are different; and/or for the Ethernet frames with different formats, the sub-protocol IDs on which the compression of the data part is based are different.

Optionally, in an embodiment of the present disclosure, the processing unit 910 is specifically configured to: compress the header at a first protocol layer; and/or compress the data part at a second protocol layer.

Optionally, in an embodiment of the present disclosure, the first protocol layer is the same as the second protocol layer.

Optionally, in an embodiment of the present disclosure, the first protocol layer is different from the second protocol layer.

Optionally, in an embodiment of the present disclosure, the first protocol layer is a packet data convergence protocol (PDCP) layer, a protocol data unit (PDU) layer or a newly added sub-layer in a fifth generation communication system (5G) network.

Optionally, in an embodiment of the present disclosure, the second protocol layer is a PDCP layer, a PDU layer or a newly added sub-layer in the 5G network.

Optionally, in an embodiment of the present disclosure, the communication device 900 is a terminal device. The communication unit 920 is further configured to: receive first signaling, which is used for indicating a sub-protocol ID used for compressing the data part.

Optionally, in an embodiment of the present disclosure, the first signaling comes from an access network device or a core network control entity.

Optionally, in an embodiment of the present disclosure, the communication device 900 is a terminal device. The communication unit 920 is further configured to: receive second signaling, which is used for indicating a sub-protocol ID used for compressing the header.

Optionally, in an embodiment of the present disclosure, the second signaling comes from a core network control entity or an access network device.

Optionally, in an embodiment of the present disclosure, the communication device 900 is a terminal device. The communication unit 920 is further configured to: report a compression capability for the Ethernet frame, which includes a compression capability for the header of the Ethernet frame and/or a compression capability for the data part of the Ethernet frame.

Optionally, in an embodiment of the present disclosure, the compression capability indicates the compression capability for the header and the compression capability for the data part, respectively.

Optionally, in an embodiment of the present disclosure, the compression capability for the header includes: whether compression of the header is supported; or whether compression of the header including the Virtual Local Area Network (VLAN) field is supported and/or whether compression of the header excluding the VLAN field is supported.

Optionally, in an embodiment of the present disclosure, the communication device 900 is a core network device.

Optionally, in an embodiment of the present disclosure, the processing unit 910 is specifically configured to: compress the header without compressing the data part; or compress both the header and the data part.

Optionally, in an embodiment of the present disclosure, the core network device is a user plane function (UPF) entity device.

Optionally, in an embodiment of the present disclosure, the communication device 900 is an access network device.

Optionally, in an embodiment of the present disclosure, the processing unit 910 is specifically configured to: compress the data part without compressing the header; or compress both the header and the data part.

Optionally, in an embodiment of the present disclosure, the communication unit 920 is further configured to: send third signaling to the terminal device, the third signaling being used for indicating a sub-protocol ID used for compressing the header and/or the data part.

Optionally, in an embodiment of the present disclosure, the communication unit 920 is further configured to: receive a feedback frame of the Ethernet frame, the feedback frame being a feedback for at least part of the compressed part of the Ethernet frame.

Optionally, in an embodiment of the present disclosure, the at least part is a variable part of the Ethernet frame and/or a static part of the Ethernet frame.

Optionally, in an embodiment of the present disclosure, the processing unit 910 is further configured to: determine whether the feedback frame aims at the data part or the header of the Ethernet frame.

Optionally, in an embodiment of the present disclosure, the processing unit 910 is specifically configured to: determine whether the feedback frame aims at the data part or the header of the Ethernet frame by using a frame format of the feedback frame and/or a sub-protocol ID included in the feedback frame.

Optionally, in an embodiment of the present disclosure, the processing unit 910 is specifically configured to: determine whether the feedback frame aims at the data part or the header of the Ethernet frame using a reserved bit of the header of the feedback frame or using a feedback part indication bit in a PDU type field of the feedback frame.

It should be understood that the terminal device 900 may correspond to the first device in the method 200, and corresponding operations of the first device in the method 200 may be implemented, which will not be repeated herein for brevity.

Figure 10:
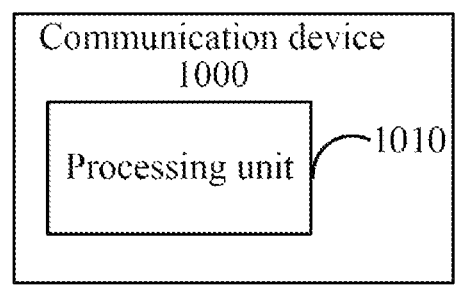
FIG. 10 is a schematic block diagram of a communication device in accordance with an implementation of the present disclosure.

FIG. 10 shows a schematic block diagram of a communication device 1000 in accordance with an embodiment of the present disclosure. As shown in FIG. 10, the communication device 1000 includes: a processing unit 1010.

The processing unit 1010 is configured to acquire an Ethernet frame from a first device.

The processing unit 1010 is further configured to decompress the Ethernet frame.

Optionally, in an embodiment of the present disclosure, the processing unit 1010 is specifically configured to decompress a header and/or a data part included in the Ethernet frame.

Optionally, in an embodiment of the present disclosure, the processing unit 1010 is specifically configured to: decompress the header and the data part based on the same first sub-protocol ID for the header and the data part.

Optionally, in an embodiment of the present disclosure, the first sub-protocol ID is used for indicating a compression object and a compression strategy; wherein the compression object indicated by the first sub-protocol ID includes the data part and the header, and corresponds to a protocol adopted by the data part, and corresponds to an Ethernet frame type adopted by the header and/or whether the header includes a virtual local area network (VLAN) field.

Optionally, in an embodiment of the present disclosure, the processing unit 1010 is specifically configured to: decompress the header based on a second sub-protocol ID for the header; and decompress the data part based on a third sub-protocol ID different from the second sub-protocol ID for the data part.

Optionally, in an embodiment of the present disclosure, the second sub-protocol ID is used for indicating a compression object and a compression strategy, wherein the compression object indicated by the second sub-protocol ID includes the header and corresponds to an Ethernet frame type adopted by the header and/or whether the header includes a VLAN field; and/or the third sub-protocol ID is used for indicating a compression object and a compression strategy, wherein the compression object indicated by the third sub-protocol ID includes the data part, and corresponds to the protocol adopted by the data part.

Optionally, in an embodiment of the present disclosure, for the Ethernet frames with different formats, the sub-protocol IDs on which the decompression of the header is based are different; and/or for the Ethernet frames with different formats, the sub-protocol IDs on which the decompression of the data part is based are different.

Optionally, in an embodiment of the present disclosure, the communication device 1000 is a terminal device. The processing unit 1010 is specifically configured to: decompress the header at a first protocol layer, and/or decompress the data part at a second protocol layer.

Optionally, in an embodiment of the present disclosure, the first protocol layer is the same as the second protocol layer.

Optionally, in an embodiment of the present disclosure, the first protocol layer is different from the second protocol layer.

Optionally, in an embodiment of the present disclosure, the first protocol layer is a packet data convergence protocol (PDCP) layer, a protocol data unit (PDU) layer or a newly added sub-layer in a fifth generation communication system (5G) network.

Optionally, in an embodiment of the present disclosure, the second protocol layer is a PDCP layer, a PDU layer or a newly added sub-layer in the 5G network.

Optionally, in an embodiment of the present disclosure, the communication device 1000 is a terminal device. The communication device 1000 further includes:

a communication unit 1020 configured to receive first signaling, which is used for indicating a sub-protocol ID used for decompressing the data part.

Optionally, in an embodiment of the present disclosure, the first signaling comes from an access network device and is radio resource control (RRC) signaling, or the first signaling comes from a core network control entity.

Optionally, in an embodiment of the present disclosure, the communication device 1000 is a terminal device. The communication device 1000 further includes a communication unit 1020 configured to receive second signaling, which is used for indicating a sub-protocol ID used for decompressing the header.

Optionally, in an embodiment of the present disclosure, the second signaling comes from a core network control entity or an access network device.

Optionally, in an embodiment of the present disclosure, the communication device 1000 is a core network device.

Optionally, in an embodiment of the present disclosure, the processing unit 1010 is specifically configured to: decompress the header without decompressing the data part; or decompress both the header and the data part.

Optionally, in an embodiment of the present disclosure, the core network device is a user plane function (UPF) entity device.

Optionally, in an embodiment of the present disclosure, the communication device 1000 is an access network device.

Optionally, in an embodiment of the present disclosure, the processing unit 1010 is specifically configured to: decompress the data part without decompressing the header; or decompress both the header and the data part.

Optionally, in an embodiment of the present disclosure, the communication device 1000 further includes a communication unit 1020 configured to send a feedback frame of the Ethernet frame, the feedback frame being a feedback for at least part of the compressed part of the Ethernet frame.

Optionally, in an embodiment of the present disclosure, the at least part is a variable part of the Ethernet frame and/or a static part of the Ethernet frame.

Optionally, in an embodiment of the present disclosure, the processing unit 101 is further configured to: generate the feedback frame for determining whether to aim at the data part or the header of the Ethernet frame.

Optionally, in an embodiment of the present disclosure, it is determined, for the feedback frame, whether the feedback frame aims at the data part or the header of the Ethernet frame through a frame format of the feedback frame and/or a sub-protocol ID included in the feedback frame.

Optionally, in an embodiment of the present disclosure, it is determined, for the feedback frame, whether the feedback frame aims at the data part or the header of the Ethernet frame through a reserved bit of the header of the feedback frame or through a feedback part indication bit in a PDU type field of the feedback frame.

It should be understood that the communication device 1000 may correspond to the second device in the method 300, and corresponding operations of the second device in the method 300 may be implemented, which will not be repeated herein for brevity.

Figure 11:
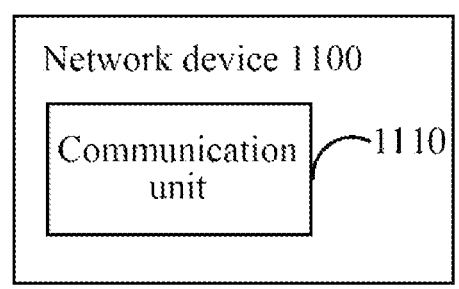
FIG. 11 is a schematic block diagram of a network device in accordance with an implementation of the present disclosure.

FIG. 11 is a schematic block diagram of a network device 1100 in accordance with an embodiment of the present disclosure. As shown in FIG. 11, the network device 1100 includes: a communication unit 1110.

The communication unit 1110 is configured to send configuration information to a terminal device, the configuration information including information for compressing or decompressing an Ethernet frame.

Optionally, in an embodiment of the present disclosure, the configuration information includes a sub-protocol ID used for compressing or decompressing the Ethernet frame and/or other compression configuration parameter used for compressing or decompressing the Ethernet frame.

Optionally, in an embodiment of the present disclosure, the configuration information includes a first sub-protocol ID, which is used for compressing a data part and a header of the Ethernet frame.

Optionally, in an embodiment of the present disclosure, the first sub-protocol ID is used for indicating a compression object and a compression strategy; wherein the compression object indicated by the first sub-protocol ID includes the data part and the header, and corresponds to a protocol adopted by the data part, and corresponds to an Ethernet frame type adopted by the header and/or whether the header includes a virtual local area network (VLAN) field.

Optionally, in an embodiment of the present disclosure, the configuration information includes a second sub-protocol ID that is used for compressing the header of the Ethernet frame, and/or a third sub-protocol ID that is used for compressing the data part of the Ethernet frame and is different from the second sub-protocol ID.

Optionally, in an embodiment of the present disclosure, the second sub-protocol ID is used for indicating a compression object and a compression strategy, wherein the compression object indicated by the second sub-protocol ID includes the header and corresponds to the Ethernet frame type adopted by the header and/or whether the header includes a VLAN field; and/or the third sub-protocol ID is used for indicating a compression object and a compression strategy, wherein the compression object indicated by the third sub-protocol ID includes the data part.

Optionally, in an embodiment of the present disclosure, the communication unit 1110 is further configured to: receive a compression capability for the Ethernet frame sent by the terminal device, the compression capability including a compression capability for the header of the Ethernet frame and/or a compression capability for the data part of the Ethernet frame. The communication unit 1110 is specifically configured to: send the configuration information to the terminal device based on the compression capability.

Optionally, in an embodiment of the present disclosure, the compression capability indicates the compression capability for the header and the compression capability for the data part, respectively.

Optionally, in an embodiment of the present disclosure, the compression capability for the header includes: whether compression of the header is supported; or whether compression of the header including the VLAN field is supported and/or whether compression of the header excluding the VLAN field is supported.

It should be understood that the network device 1100 may correspond to the network device in the method 400, and corresponding operations of the network device in the method 400 may be implemented, which will not be repeated herein for brevity.

Figure 12:
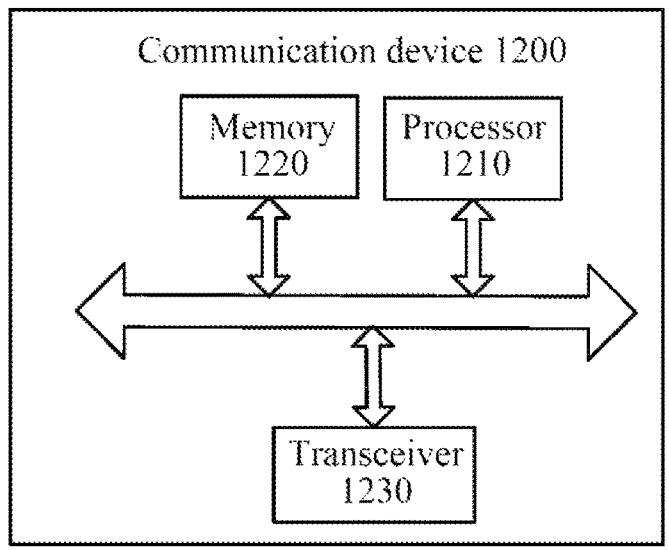
FIG. 12 is a schematic block diagram of a communication device in accordance with an implementation of the present disclosure.

FIG. 12 is a schematic structure diagram of a communication device 1200 in accordance with an embodiment of the present disclosure. The communication device 1200 shown in FIG. 12 includes a processor 1210, which may call and run a computer program from a memory to implement the methods in accordance with the embodiments of the present disclosure.

Optionally, as shown in FIG. 12, the terminal device 1200 may further include a memory 1220. The processor 1210 may call and run the computer program from the memory 1220 to implement the methods in accordance with the embodiments of the present disclosure.

The memory 1220 may be a separate device independent of the processor 1210 or may be integrated in the processor 1210.

Optionally, as shown in FIG. 12, the communication device 1200 may further include a transceiver 1230. The processor 1210 can control the transceiver 1230 to communicate with other device. Specifically, the transceiver 1230 may send information or data to other device or receive information or data sent by other device.

The transceiver 1230 may include a transmitter and a receiver. The transceiver 1230 may further include antennas, the number of which may be one or more.

Optionally, the communication device 1200 may specifically be the first device in accordance with the embodiments of the present disclosure, and the communication device 1200 may implement the corresponding processes implemented by the first device in various methods in accordance with the embodiments of the present disclosure, which will not be repeated herein for brevity.

Optionally, the communication device 1200 may specifically be the second device in accordance with the embodiments of the present disclosure, and the communication device 1200 may implement the corresponding processes implemented by the second device in various methods in accordance with the embodiments of the present disclosure, which will not be repeated herein for brevity.

Optionally, the communication device 1200 may specifically be the network device in accordance with the embodiments of the present disclosure, and the communication device 1200 may implement the corresponding processes implemented by the network device in various methods in accordance with the embodiments of the present disclosure, which will not be repeated herein for brevity.

Figure 13:
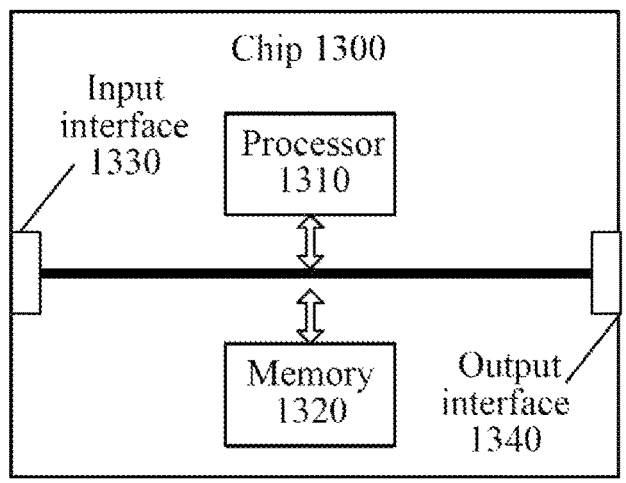
FIG. 13 is a schematic block diagram of a chip in accordance with an implementation of the present disclosure.

FIG. 13 is a schematic structure diagram of a chip in accordance with an embodiment of the present disclosure. The chip 1300 shown in FIG. 13 includes a processor 1310. The processor 1310 may call and run a computer program from a memory to implement the methods in accordance with the embodiments of the present disclosure.

Optionally, as shown in FIG. 13, the chip 1300 may further include a memory 1320. The processor 1310 may call and run the computer program from the memory 1320 to implement the methods in accordance with the embodiments of the present disclosure.

The memory 1320 may be a separate device independent of the processor 1310 or may be integrated in the processor 1310.

Optionally, the chip 1300 may further include an input interface 1330. The processor 1310 may control the input interface 1330 to communicate with other device or chip. Specifically, the processor 1310 may acquire information or data sent by other device or chip.

Optionally, the chip 1300 may further include an output interface 1340. The processor 1310 may control the output interface 1340 to communicate with other device or chip. Specifically, the processor 1310 may output information or data to other device or chip.

Optionally, the chip may be applied to the first device in the embodiments of the present disclosure, and the chip may implement the corresponding processes implemented by the first device in various methods in accordance with the embodiments of the present disclosure, which will not be repeated herein for brevity.

Optionally, the chip may be applied to the second device in the embodiments of the present disclosure, and the chip may implement the corresponding processes implemented by the second device in various methods in accordance with the embodiments of the present disclosure, which will not be repeated herein for brevity.

Optionally, the chip may be applied to the network device in the embodiments of the present disclosure, and the chip may implement the corresponding processes implemented by the network device in various methods in accordance with the embodiments of the present disclosure, which will not be repeated herein for brevity.

It should be understood that the chip mentioned in the embodiments of the present disclosure may be referred to as a system-level chip, a system chip, a chip system or a system-on-chip, etc.

It should be understood that a processor in an embodiment of the present disclosure may be an integrated circuit chip having a signal processing capability. In an implementation process, the acts of the foregoing method embodiments may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, acts and logical block diagrams disclosed in the embodiments of the present disclosure. The general purpose processor may be a microprocessor, or the processor may also be any conventional processor, or the like. The acts of the methods disclosed in the embodiments of the present disclosure may be directly embodied to be implemented by a hardware decoding processor, or may be implemented by a combination of hardware and software modules in the decoding processor. The software modules may be located in a storage medium which is conventional in the art, such as a random access memory, a flash memory, a read-only memory, a programmable read-only memory, an electrically erasable programmable memory, or a register. The storage medium is located in the memory, and the processor reads information in the memory and completes the acts of the foregoing methods in combination with its hardware.

It may be understood that the memory in the embodiments of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the embodiments of the present disclosure is intended to include, but not be limited to, these and any other suitable types of memories.

Figure 14:
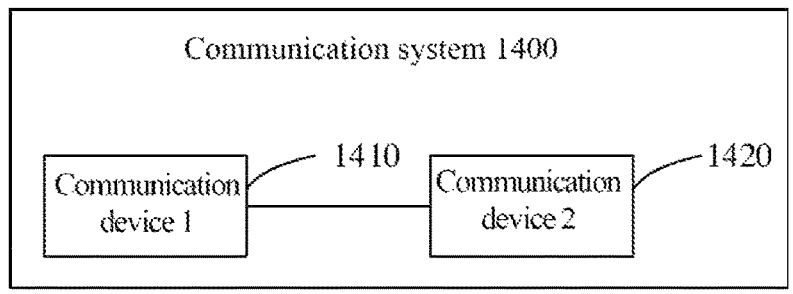
FIG. 14 is a schematic block diagram of a communication system in accordance with an implementation of the present disclosure.

FIG. 14 is a schematic block diagram of a communication system 1400 in accordance with an embodiment of the present disclosure. As shown in FIG. 14, the communication system 1400 includes a communication device 1 1410 and a communication device 2 1420.

The communication device 1 1410 may be configured to implement the corresponding functions implemented by the first device in the above-mentioned methods, and the communication device 2 1420 may be configured to implement the corresponding functions implemented by the second device in the above-mentioned methods, which will not be repeated herein for brevity.

Figure 15:
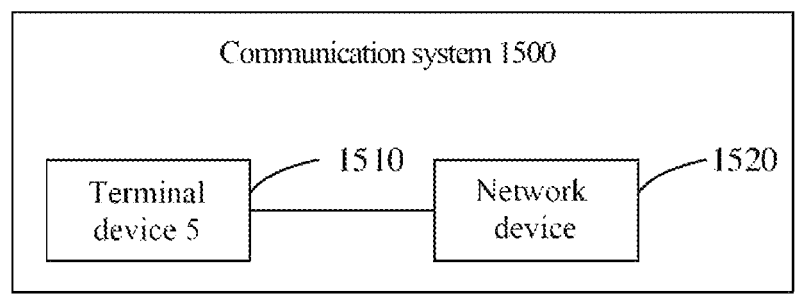
FIG. 15 is a schematic block diagram of a communication system in accordance with an implementation of the present disclosure.

FIG. 15 is a schematic block diagram of a communication system 1500 in accordance with an embodiment of the present disclosure. As shown in FIG. 15, the communication system 1500 may include a terminal device 1510 and a network device 1520.

The network device 1520 may be configured to implement the corresponding functions implemented by the network device in the above-mentioned method 400, which will not be repeated for brevity.

An embodiment of the present disclosure further provides a computer readable storage medium used for storing a computer program.

Optionally, the computer readable storage medium may be applied to the terminal device in the embodiments of the present disclosure, and the computer program enables a computer to perform the corresponding processes implemented by the first terminal device or the second terminal device in various methods in accordance with the embodiments of the present disclosure, which will not be repeated for brevity.

Optionally, the computer readable storage medium may be applied to the network device in the embodiments of the present disclosure, and the computer program enables the computer to perform the corresponding processes implemented by the network device in various methods in accordance with the embodiments of the present disclosure, which will not be repeated for brevity.

An embodiment of the present disclosure further provides a computer program product including computer program instructions.

Optionally, the computer program product may be applied to the terminal device in the embodiments of the present disclosure, and the computer program instructions enable a computer to perform the corresponding processes implemented by the first terminal device or the second terminal device in various methods in accordance with the embodiments of the present disclosure, which will not be repeated for brevity.

Optionally, the computer program product may be applied to the network device in the embodiments of the present disclosure, and the computer program instructions enable the computer to perform the corresponding processes implemented by the network device in various methods in accordance with the embodiments of the present disclosure, which will not be repeated for brevity.

An embodiment of the present disclosure further provides a computer program.

Optionally, the computer program may be applied to the terminal device in the embodiments of the present disclosure. The computer program, when running on a computer, enables the computer to perform the corresponding processes implemented by the first terminal device or the second terminal device in various methods in accordance with the embodiments of the present disclosure, which will not be repeated for brevity.

Optionally, the computer program may be applied to the network device in the embodiments of the present disclosure. The computer program, when running on a computer, enables the computer to perform the corresponding processes implemented by the network device in various methods in accordance with the embodiments of the present disclosure, which will not be repeated for brevity.

A person of ordinary skill in the art may recognize that the elements and algorithm acts in various examples described in combination with the embodiments disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method embodiments and will not be repeated herein.

In several embodiments provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of solutions of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the acts of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

I claim:

1. A communication device, wherein the communication device is a first device and comprises: a processor and a transceiver, wherein
    the processor is configured to compress an Ethernet frame; and
    the transceiver is configured to send the compressed Ethernet frame to a second device via an access network device;
    wherein the first device is a terminal device, and the second device is a Session Management Function (SMF) which is a core network device, the transceiver is further configured to:
        report a compression capability for the Ethernet frame to the SMF via the access network device, wherein the compression capability comprises a compression capability for a header of the Ethernet frame and/or a compression capability for a data part of the Ethernet frame; and
        receive configuration information from the SMF via the access network device, wherein the configuration information comprises information for compressing or decompressing the Ethernet frame,
wherein the processor is configured to transition to a different compression state machine when the transceiver receives a feedback frame of the compressed Ethernet frame indicating at least part of the Ethernet frame is not decompressed successfully, wherein the feedback frame is a negative feedback for at least part of a compressed part of the Ethernet frame.

2. The communication device of claim 1, wherein the processor is specifically configured to:
compress the header and/or the data part contained in the Ethernet frame.

3. The communication device of claim 2, wherein the configuration information comprises a first sub-protocol ID; and the processor is specifically configured to:
compress the header and the data part based on a same first sub-protocol ID for the header and the data part.

4. The communication device of claim 3, wherein the first sub-protocol ID is used for indicating a compression object and a compression strategy;
wherein the compression object indicated by the first sub-protocol ID comprises the data part and the header, and corresponds to a protocol adopted by the data part, and corresponds to an Ethernet frame type adopted by the header and/or whether the header comprises a virtual local area network (VLAN) field.

5. The communication device of claim 2, wherein the configuration information comprises a second sub-protocol ID and a third sub-protocol ID; and the processor is specifically configured to:
compress the header based on the second sub-protocol ID for the header; and
compress the data part based on the third sub-protocol ID different from the second sub-protocol ID for the data part.

6. The communication device of claim 5, wherein the second sub-protocol ID is used for indicating a compression object and a compression strategy, wherein the compression object indicated by the second sub-protocol ID comprises the header and corresponds to an Ethernet frame type adopted by the header and/or whether the header comprises a VLAN field; and/or
the third sub-protocol ID is used for indicating a compression object and a compression strategy, wherein the compression object indicated by the third sub-protocol ID comprises the data part, and corresponds to the protocol adopted by the data part.

7. The communication device of claim 2, wherein for Ethernet frames with different formats, sub-protocol IDs on which the compression of the header is based are different; and/or
for the Ethernet frames with different formats, the sub-protocol IDs on which the compression of the data part is based are different.

8. The communication device of claim 2, wherein the processor is specifically configured to:
compress the header at a first protocol layer; and/or
compress the data part at a second protocol layer.

9. The communication device of claim 2, wherein the transceiver is further configured to:
receive first signaling, wherein the first signaling is used for indicating a sub-protocol ID used for compressing the data part,
wherein the first signaling comes from an access network device or a core network control entity.

10. The communication device of claim 2, wherein the transceiver is further configured to:
receive second signaling, wherein the second signaling is used for indicating a sub-protocol ID used for compressing the header,
wherein the second signaling comes from a core network control entity or an access network device.

11. The communication device of claim 1,
wherein the compression capability indicates the compression capability for the header and the compression capability for the data part, respectively,
wherein the compression capability for the header comprises: whether compression of the header is supported; or whether compression of the header comprising the Virtual Local Area Network (VLAN) field is supported and/or whether compression of the header excluding the VLAN field is supported.

12. The communication device of claim 1,
wherein the at least part comprises the header or the data part of the Ethernet frame.

13. The communication device of claim 12, wherein the processor is further configured to:
determine whether the feedback frame aims at the data part or the header of the Ethernet frame by using a frame format of the feedback frame; wherein a first frame format is used for indicating the feedback frame aims at the header of the Ethernet frame, a second frame format is used for indicating the feedback frame aims at the data part of the Ethernet frame; and the first frame format is different from the second frame format.

14. The communication device of claim 12 wherein the processor is configured to:
determine whether the feedback frame aims at the data part or the header of the Ethernet frame by using a sub-protocol ID contained in the feedback frame.

15. A communication device, wherein the communication device is a second device and comprises:
a processor and a transceiver, wherein
the processor is configured to acquire an Ethernet frame from a first device via an access network device; and decompress the Ethernet frame;
wherein the second device is a Session Management Function (SMF) which is a core network device, and the first device is a terminal device, the transceiver is configured to:
receive a compression capability for the Ethernet frame sent by the terminal device via the access network device, wherein the compression capability comprises a compression capability for a header of the Ethernet frame and/or a compression capability for a data part of the Ethernet frame; and
send configuration information to the terminal device via the access network device, wherein the configuration information comprises information for compressing or decompressing the Ethernet frame,
wherein the processor is configured to transmit a feedback frame of the compressed Ethernet frame indicating at least part of the Ethernet frame is not decompressed successfully, wherein the feedback frame is a negative feedback for at least part of a compressed part of the Ethernet frame, and to cause the first device to transition to a different compression state machine when the feedback frame is received.

16. The communication device of claim 15, wherein the processor is specifically configured to:
decompress the header and/or the data part contained in the Ethernet frame.

17. The communication device of claim 16, wherein the processor is specifically configured to:
decompress the header without decompressing the data part; or
decompress both the header and the data part.

18. A wireless communication method, comprising:
compressing, by a first device, an Ethernet frame; and
sending, by the first device, the compressed Ethernet frame to a second device via an access network device;
wherein the first device is a terminal device, and the second device is a Session Management Function (SMF) which is a core network device, and the method further comprises:
reporting, by the terminal device, a compression capability for the Ethernet frame to the SMF via the access network device, wherein the compression capability comprises a compression capability for a header of the Ethernet frame and/or a compression capability for a data part of the Ethernet frame;
receiving, by the terminal device, configuration information from the SMF via the access network device, wherein the configuration information comprises information for compressing or decompressing the Ethernet frame,
transitioning to a different compression state machine when the transceiver receives a feedback frame of the compressed Ethernet frame indicating at least part of the Ethernet frame is not decompressed successfully, wherein the feedback frame is a negative feedback for at least part of a compressed part of the Ethernet frame.

19. A wireless communication method comprising:
acquiring, by a second device, an Ethernet frame from a first device via an access network device; and
decompressing, by the second device, the Ethernet frame;
wherein the second device is a Session Management Function (SMF) which is a core network device, and the first device is a terminal device, and the method further comprises:
receiving, by the SMF, a compression capability for the Ethernet frame sent by the terminal device via the access network device, wherein the compression capability comprises a compression capability for a header of the Ethernet frame and/or a compression capability for a data part of the Ethernet frame;
sending, by the SMF, configuration information to the terminal device via the access network device, wherein the configuration information comprises information for compressing or decompressing the Ethernet frame,
transmitting a feedback frame of the compressed Ethernet frame indicating at least part of the Ethernet frame is not decompressed successfully, wherein the feedback frame is a negative feedback for at least part of a compressed part of the Ethernet frame, and causing the first device to transition to a more reliable compression state machine when the feedback frame is received.

20. The communication device of claim 12, wherein the processor is configured to:
determine whether the feedback frame aims at the data part or the header of the Ethernet frame by using a reserved bit of the header of the feedback frame or using a feedback part indication bit in a PDU type field of the feedback frame.

21. The communication device of claim 12, wherein a sequence number (SN) of the header of the Ethernet frame is carried in a feedback frame aiming at the header, and an SN of the header of the Ethernet frame is carried in a feedback frame aiming at the data part.

* * * * *